Figure 1:
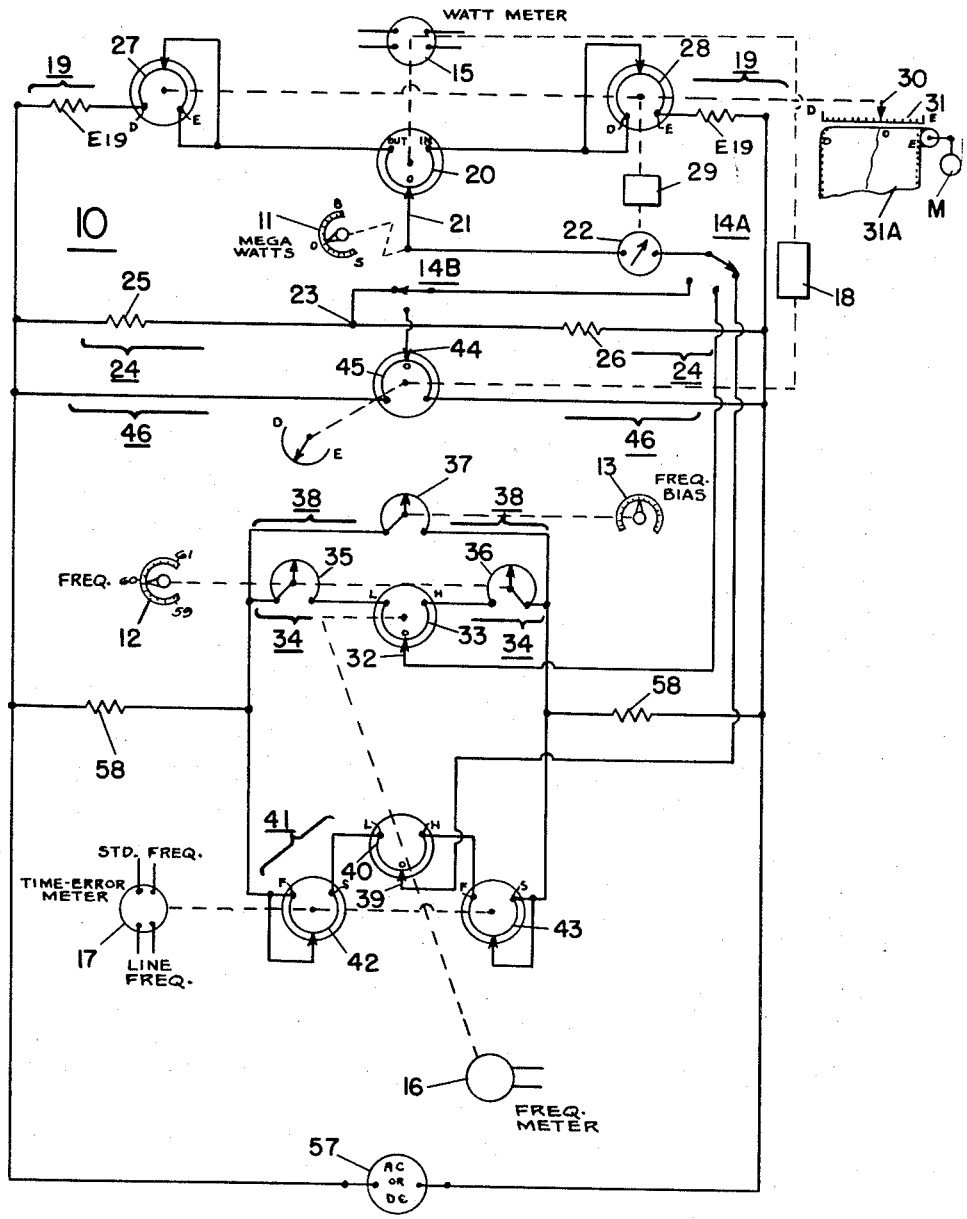

Sept. 7, 1954  J. B. CAROLUS  2,688,728
METHOD AND ARRANGEMENT FOR MEASURING SCHEDULE DEVIATIONS
Filed May 24, 1951  3 Sheets-Sheet 2

INVENTOR.
JAMES B. CAROLUS
BY
Woodcock and Phelan
ATTORNEYS

Sept. 7, 1954 J. B. CAROLUS 2,688,728
METHOD AND ARRANGEMENT FOR MEASURING SCHEDULE DEVIATIONS
Filed May 24, 1951 3 Sheets-Sheet 3

INVENTOR.
JAMES B. CAROLUS
BY
*Woodcock and Phelan*
ATTORNEYS

Patented Sept. 7, 1954

2,688,728

UNITED STATES PATENT OFFICE 2,688,728

METHOD AND ARRANGEMENT FOR MEASURING SCHEDULE DEVIATIONS

James B. Carolus, Elkins Park, Pa., assignor to Leeds and Northrup Company, Philadelphia, Pa., a corporation of Pennsylvania Application May 24, 1951, Serial No. 228,036

16 Claims. (Cl. 324—73)

This invention relates to electrical power distribution systems in which there is interchange of power over tie-lines between different generating areas and particularly relates to methods and arrangements for measuring the generation change necessary in an area to meet its scheduled interchange.

In power distribution systems, the various generating areas are interconnected by tie-lines for interchange of power on tie-line load schedules which are complicated by the fact that under contractual relations, or systems load-dispatcher's orders, a given area may be required at different times either to supply or receive power over the tie-line and in either case also to assist in correction of system time, to share in maintenance of system frequency, or to correct for an integrated tie-line load error of the area. Heretofore the load dispatcher in control of generation in an area had to keep continuously in mind the conflicting requirements of different schedules and had to evaluate, in sense and magnitude, the factors involved in each schedule. Failure so to do at all times not only upset the area schedule with resultant contractual penalties but also often substantially disturbed the system with consequent need for otherwise unnecessary re-scheduling.

It is an object of the present invention to provide a direct measure of the change in generation necessary to meet the requirements of any of various schedules in effect at different times.

More particularly, there is provided an arrangement in which, under dispatcher's orders, or at times fixed by contract, schedule dials and switches are set or reset in accordance with scheduled tie-line load, scheduled system frequency and the particular schedule, such as flat tie-line load, frequency-biased tie-line load, frequency/time-error biased tie-line load, integrated tie-line load error, or biased tie-line load, then in effect. The schedule dials are impedance-adjusting means of a self-balancing measuring system also including elements adjusted by devices responsive to tie-line load, system-frequency, system time-error and integrated tie-line load error. An exhibiting element following the rebalancing action of the measuring system continuously indicates and/or records the excess or deficiency of generation with respect to each of the various schedules as it is put in effect.

More particularly and preferably, the self-balancing measuring system is of bridge or potentiometer type in which the difference in setting of electrical impedance-adjusting elements, respectively positioned by the tie-line load schedule dial and by the tie-line wattmeter, provides a potential-difference selectively combined with potential differences respectively corresponding with the various aforesaid schedules to which the area is subject. A detector responsive to unbalance of the selected potential differences effects rebalancing adjustment of an impedance and repositioning of the exhibiting element indicating the excess or deficiency of generation in the area for the selected schedule.

The invention further resides in methods and arrangements having the features of novelty and utility hereinafter described and claimed.

Figure 2A:
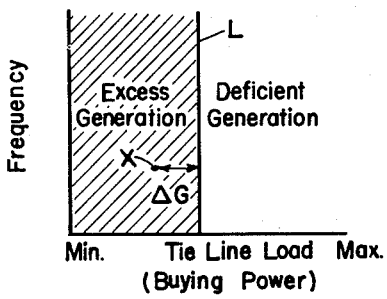
Figure 2B:
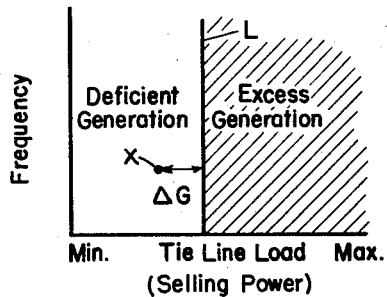
Figure 2C:
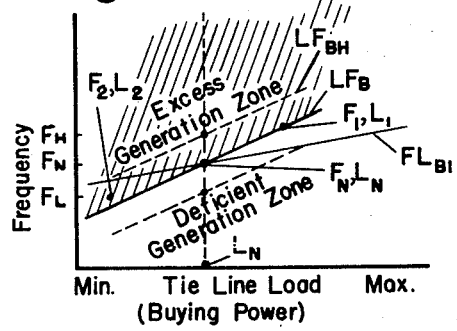
Figure 2D:
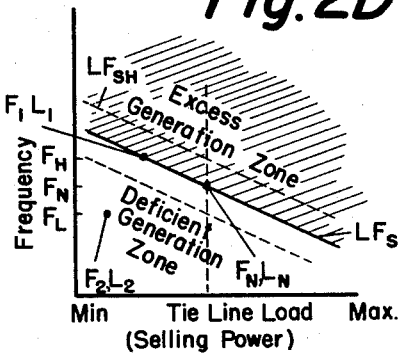
Figure 4:
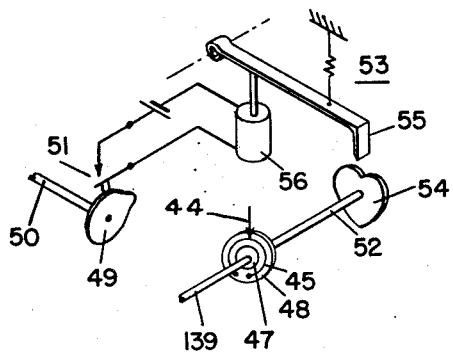
Figure 3:
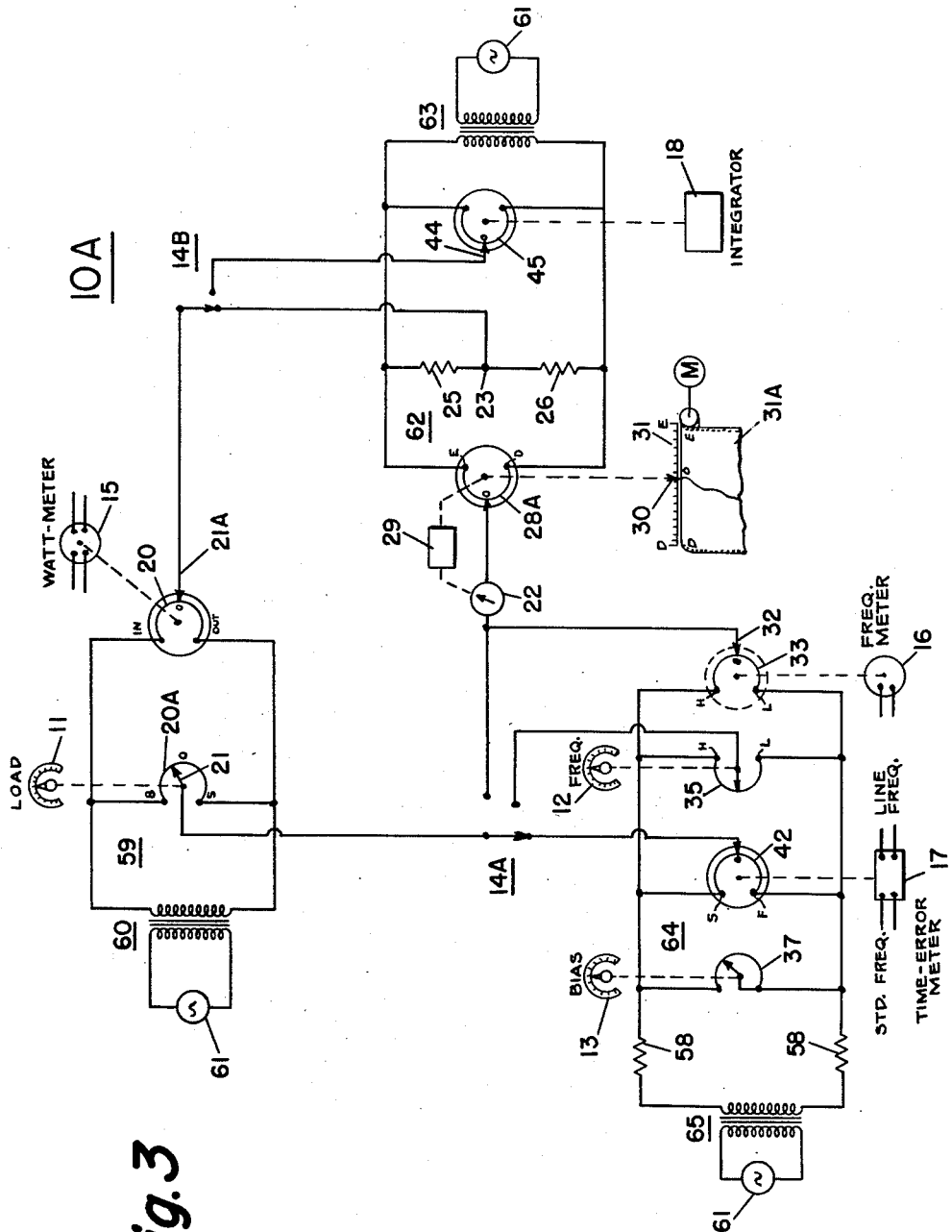

For a more detailed understanding of the invention and for illustration of measuring systems embodying it, reference is made to the accompanying drawings in which:

Fig. 1 schematically illustrates a schedule-deviation recorder employing a balanceable measuring system of the bridge type;

Figs. 2A–2D are explanatory figures referred to in discussion of Figs. 1 and 3;

Fig 3 schematically illustrates a schedule-deviation recorder employing a balanceable measuring system of the potentiometer type; and Fig. 4 in perspective illustrates a resetting arrangement which may be used in integration of schedule deviations.

Figs 1 and 3 are exemplary of arrangements for indicating or recording the change in generation in an area necessary to meet its requirements under any of various schedules to which it is subject. Each comprises a self-balancing measuring network provided with impedances shown as resistors and slidewire resistors together with impedance-adjusting dials 11, 12, 13 which are set to positions corresponding with the scheduled tie-line load of the area, the scheduled system frequency and the frequency-bias of the area. These dials, as well as the schedule-selector switches 14A, 14B are reset from time to time, under directions from the system load dispatcher or in accordance with a contract schedule, to positions corresponding with obligations of the area concerning its purchase or sale of interchange power on either an integrated or instantaneous basis and its contribution to maintenance of system frequency on either an integrated or instantaneous basis. The instruments or devices 15, 16, 17 and 18, respectively responsive to tie-line power, system frequency, system time-error and integrated deviation from scheduled tie-line load, provide automatic adjustment of impedances of the measuring network and cooperate, as later more fully explained, with the manual adjustments of dials 11 to 13 to provide potential differences related to tie-line load deviations system-frequency deviations, system time-error, and integrated tie-line interchange error.

There are first described the system components of Fig. 1 involved in operation under a flat tie-line load schedule and the manner in which there are avoided ambiguities occasioned by the circumstance that the area may be either purchasing or selling power.

When an area is on flat tie-line load and scheduled to buy a specified amount of power, the scheduled load-frequency relation is shown by line L of Fig. 2A. If the actual tie-line load is below the scheduled value because, for example, of operation at point X, there is excess generation in the area and the area load dispatcher should reduce generation by amount ΔG to put the area on schedule. If on the other hand, the area is on flat tie-line load basis and scheduled to sell that specified amount of power, operation at the same point X, as shown in Fig. 2B, is occasioned by a deficiency of generation in the area and the area load dispatcher should increase generation by amount ΔG to put the area on schedule. Such ambiguity is obviated by the present invention which translates the deviations from schedule into an unambiguous indication of excess or deficient generation so that once the dial 11 and switches 14A, 14B are set for the schedule, the dispatcher need not further keep in mind what the scheduled load is or whether his area is on buying or selling basis.

Reverting to Fig. 1, circuit 19 of network 10 includes a linear slidewire 20 coupled to wattmeter 15 which is responsive to the tie-line load. The contact 21 for slidewire 20 is coupled to dial 11 calibrated in power units, for example, megawatts, with the numerical values increasing in opposite directions from an intermediate zero point. For simplicity of explanation, it will be assumed that with dial 11 set at zero for a scheduled zero interchange of power, the contact 21 engages the center or zero point of slidewire 20 when the position of slidewire 20 corresponds with actual zero tie-line load. If the area is actually receiving power over the tie-line, the slidewire 20 is positioned by wattmeter 15 so that contact 21 is nearer the "In" terminal of slidewire 20 by an amount corresponding with the incoming power. If on the other hand, the area is actually supplying power over the tie-line, the slidewire 20 is displaced by wattmeter 15 so that its "Out" terminal is nearer contact 21 by amount corresponding with the outgoing power. Thus, the displacement of the zero of slidewire 20 with respect to contact 21 corresponds in sense and extent with the deviation of the tie-line load from the scheduled zero value.

Now assuming that the schedule requires the area to supply a specified amount of power to the system, the dial 11 is moved from its zero toward the selling or "S" end to indicate the corresponding megawatts. By such adjustment, the slidewire contact 21 is moved to corresponding extent away from the "Out" terminal of slidewire 20. Consequently, the zero of the slidewire 20 will engage contact 21 when the wattmeter 15 indicates the scheduled amount of outgoing power. If the area is supplying more than the scheduled amount of power, the wattmeter 15 so positions the slidewire 20 that its zero is to the right of contact 21 to a corresponding extent, whereas if the area is supplying less than the scheduled amount or is receiving power, the wattmeter 15 so positions slidewire 20 that its zero is to the left of contact 21 to extent corresponding with the deviation from schedule.

Now assuming the schedule requires the area to receive a specified amount of power from the system, the dial 11 is moved from its zero toward the buying or "B" end to indicate the corresponding megawatts. By such adjustment, the contact 21 is moved to corresponding extent away from the "In" terminal of slidewire 20. Consequently, the zero of the slidewire 20 engages contact 21 when wattmeter 15 indicates the scheduled amount of incoming power. If the area is receiving more than the scheduled power, the wattmeter 15 so positions the slidewire 20 that its zero is to the left of contact 21 by a corresponding extent whereas if the area is receiving less than the scheduled amount or is supplying power, the wattmeter 15 so positions slidewire 20 that its zero is to the right of contact 21 to extent corresponding with the deviation from schedule.

When the area is operating under a flat tie-line load schedule, which means it is required to buy or sell a certain amount of power regardless of variables such as system frequency or system time-error, the schedule-selector switches 14A, 14B are set to connect detector 22 between contact 21 and a point 23 of fixed potential in a second circuit 24 of network 10. The impedances 25, 26 of circuit 24 form, in Fig. 1, two equal arms of a Wheatstone bridge whose other two arms respectively include the variable portions of wattmeter slidewire 20 to the left and right of its schedule contact 21. The latter two arms also respectively include the rebalancing impedances 27, 28 complementarily adjustable under control of detector 22 through a mechanical or electromechanical device 29 such as shown in Squibb Patent No. 1,935,732 or the Williams Patent No. 2,113,164 automatically to maintain balance as the tie-line load varies from scheduled value corresponding with the setting of dial 11. The end coils E19 if used are of equal resistance.

Concurrently with rebalancing adjustment of rebalancing impedances 27, 28, the indicator or pen 30 is moved with respect to scale 31 or recorder chart 31A driven from a suitable timing motor M. It is to be noted that the exhibiting element 30 will be at the zero of the associated scale or chart when the actual tie-line load matches the schedule setting of dial 11 whether the schedule setting be zero or a specified value of megawatts of either incoming or outgoing power. It is further to be noted that if the actual tie-line load does not correspond with the schedule, the element 30 indicates the deficiency or excess of generation in the area without ambiguity occasioned by the circumstance that at one time the schedule may be for a specified amount of outgoing power and at another time for a specified amount of incoming power.

When an area is on a frequency-biased tie-line load schedule and obligated to buy a specified amount of power at a specified system frequency, the schedule load-frequency relationship is exemplified by line $LF_B$ of Fig. 2C with the normal operating point at frequency $F_n$ and tie-line load $L_m$. From this figure, it is evident that the frequency and wattmeter readings neither individually nor jointly inform the area load dispatcher whether the generation of his area meets the schedule, is excessive, or is deficient. For example, if the actual tie-line load is LN, the area is on schedule at frequency $F_n$: if the system frequency is $F_1$, the area is not on schedule unless the tie-line load is $L_1$. Under this latter condition, the tie-line wattmeter would falsely indicate the area was on schedule whereas the load dispatcher would have to compute the generation change with the bias requirements in mind to actually bring the area on schedule. Fig. 2C represents the conditions to be considered in buying power: Fig. 2D represents the conditions to be considered in selling power. In both cases, the factors necessarily considered are the magnitude and direction of the actual tie-line load, the magnitude and direction of the scheduled tie-line load, the actual system frequency, the scheduled system frequency, and the bias in terms of megawatts per cycle.

These ambiguities are resolved by the present invention which translates the deviation from a frequency-biased tie-line load schedule into an unambiguous indication of excess or deficient generation. When the area is scheduled to operate on a frequency-biased tie-line load schedule, the schedule selector switches 14A, 14B are set to connect the detector 22 between the contact 21 of the wattmeter slidewire 20 and the movable contact 32 of a slidewire 33 coupled to the frequency meter or recorder 16. The slidewire 33 is connected in a third circuit 34 of the measuring network 10. In this same circuit are included the complementarily adjustable impedances 35, 36 coupled to the dial 12 set in accordance with the scheduled system frequency.

When the system frequency corresponds with the scheduled setting of dial 12 and the tie-line load corresponds with the setting of dial 11, the operating point of the area corresponds with point $F_n$, $L_n$ of Figs. 2C and 2D. If the area is buying power, the measuring system is in balance for all combinations of frequency and load representable by points falling on the line $LF_B$ of Fig. 2C. For all combinations of load and frequency falling within the area "Excess Generation" of Fig. 2C, the measuring system is unbalanced in such sense that the exhibiting element 30 moves with respect to scale 31 or chart 31A to indicate the value of the excess generation. For all combinations of load and frequency falling within the area of "Deficient generation" of Fig. 2C, the measuring network is unbalanced in opposite sense and the exhibiting element 30 moves with respect to scale 31 or chart 31A to indicate the amount of deficiency in generation.

If the area is selling power, all combinations of frequency and load meeting the scheduled requirements correspond with points falling on the line $LF_S$ of Fig. 2D. All combinations of frequency and load for which the generation is in excess of the scheduled sale of power fall within the area "Excess generation," Fig. 2D. For all such combinations of frequency and load, the measuring network is unbalanced in such sense that the exhibiting element moves towards the "E" end of the associated scale 31 or chart 31A to indicate the amount by which the generation is excessive.

For all combinations of load and frequency corresponding with "Deficiency of generation" to meet the scheduled sale of power, the measuring network 10 is unbalanced in opposite sense and the exhibiting element 30 moves toward the "D" end of the associated chart or scale 31.

However, it should be noted that in all cases the exhibiting element indicates to the area load dispatcher the change in generation required to bring the area back on schedule and he need not know or concern himself with the existing system frequency, the existing tie-line load, or whether his area is supplying or receiving power.

In the foregoing discussion of operation under a frequency-biased tie-line load schedule, it has been assumed that the bias is fixed. However, the situation is more complicated in that the frequency bias requirement upon an area is different at different times, which in absence of the invention makes it all the more difficult for the area load dispatcher to know to what extent and in what sense the generation in his area should be changed at a particular time to meet his schedule for given readings of system frequency and tie-line load. For example, if the frequency bias is such that the load frequency relationship corresponding with schedule is exemplified by line $FL_{B_1}$ of Fig. 2C, the operating point $F_2$, $L_2$ which previously fell in an "Excess generation" zone now falls in "Deficient generation" zone. This and other ambiguities arising because of changes in the frequency-bias requirements are resolved in manner now described.

In the network 10 of Fig. 1, the impedance 37 is included in a circuit or branch 38 in shunt to branch 34 which includes the frequency slidewire 33: both branches are connected through resistors 58, 58 to supply source 37 of network 10. The adjustable element of impedance 37 is coupled to the frequency bias dial 13. The dial 13 is set under orders from the dispatcher or in correspondence with contract to shift the slope of the load frequency characteristic from that of line $LF_B$ to $FL_{B_1}$. In general, as the value of resistance 37 is decreased, the slope of the load-frequency characteristic is increased and in the limit is the flat tie-line load characteristic L of Fig. 1. If, on the other hand, the value of the resistance 37 is increased, the slope of the characteristic decreases as from that of line $LF_B$ to $FL_{B_1}$.

Thus, having set the dial 13 in accordance with the scheduled frequency bias, the load dispatcher need no longer concern himself with change in location of the excess and deficient generation zones (Figs. 2C, 2D) and may directly read from the recorder or indicator 30, 31 or 30, 31A the change in area generation necessary to bring it on schedule.

In actual operation of the system, it is often necessary to make up system time in order that the time indicated by synchronous clocks on the line should be correct. For such purpose, it is desirable that all or specified areas in the system contribute to the correction of system time. Such correction can be effected by operating at a different system frequency for a length of time sufficient to make up the time-error. If the system time is slow, the system operating frequency may be changed to the higher value $F_H$, Figs. 2C and 2D, which raises the characteristic curves $LF_B$, $LF_S$, without change of slope to the position of the lines $LF_{BH}$, $LF_{SH}$ respectively. Thus, again many points which were previously in a region of "Excess generation" now fall in the zone of "Deficient generation," and vice versa. In absence of the invention, this would again present a complex picture to the area load dispatcher, both as to the sense and amount of generation required by his area to meet the schedule.

In accordance with the present invention, the area load dispatcher sets the dial 12 to the new schedule-value of system frequency to be held for time-error correction. This so shifts the conditions of balance of the measuring system that the exhibiting element 30 directly indicates the excess or deficiency of generation under existing conditions of schedule tie-line load and new schedule frequency.

With the system thus far described, it is necessary that the system load dispatcher advise the area load dispatcher when the time-error has been corrected, whereupon the area load dispatcher will reset the dial 12 to the normal system frequency. Instead of correcting system time-error by operation of the system at a fixed system frequency other than normal system frequency, the system operator may consider it desirable to operate the system at a frequency related to the existent time-error. This involves a continuous changing of the system frequency, and in absence of the invention would still further complicate the problems of the area load dispatcher in controlling his generation to maintain his area on schedule.

In accordance with the present invention, the system load dispatcher would advise the area load dispatcher that this type of correction was to be employed, whereupon the area load dispatcher would set the schedule switch 14A to connect the detector 22 between the contact 21 of the wattmeter slidewire 20 and the contact 39 of slidewire 40 driven from or by the system frequency meter 16. The slidewire 40 is included in branch circuit 41 which also includes the complementarily adjustable impedances 42, 43 driven from or by the system time-error device 17. This device may be a mechanical differential interposed between motors energized respectively at line frequency and standard frequency; or, alternatively, it may be an electrical differential such as a "Lincoln synchroscope."

Without action or attention of the area load dispatcher, the balance point of the measuring system takes into account the circumstances that the system frequency should be high if the system time is slow, low if the system time is fast; and further makes it unnecessary for him to know whether the system frequency is correcting or not correcting the time-error. Under all these circumstances, the exhibiting element 30 indicates to him the excess or deficiency of generation required to meet his schedule under the scheduled tie-line load, normal schedule frequency, and schedule frequency bias.

Under actual operating conditions of a system over a period of time, it may be impossible for an area exactly to maintain its schedule, with the result there may be an integrated deviation from schedule. The area may be required to correct for such error.

In such case, the area load dispatcher would set the schedule switches 14A, 14B to connect the detector 22 between the contact 21 of the wattmeter slidewire 20 and the contact 44 of a slidewire 45 included in circuit 46 and driven by or from an integrator 18.

The integrating device 18 may be of the type shown in Ross Patent No. 2,309,790, Fig. 5, in which case the movable element of the adjustable slidewire device 44, 45 would be positioned by shaft 39 of Fig. 5 of the Ross patent. The input shaft of the integrator may be positioned by wattmeter 15 in accordance with deviations from the scheduled tie-line load.

Assuming that since the time that contact 44 was last at the zero of slidewire 45 the generation of the area has continuously been in excess of that required by schedule, upon movement of schedule switch 14B to connect with contact 44, the detector 22 will respond in sense effecting further movement of the exhibiting element 30 toward the "E" end of scale 31. If, however, during such period, the generation has sometimes been in excess of schedule requirements and at other times been deficient, upon movement of schedule switch 14B to connect with contact 44, the detector 22 may not respond at all, or may respond in either sense depending upon whether there is no integrated deviation from schedule, or whether the present deviation from schedule is in sense corrective of the integrated generation deviation or tends further to increase the integrated deviation.

Upon so switching to circuit 46, including the integrating slidewire 45, the balance point of the measuring system thereafter, without further attention of the area load dispatcher, takes into account whether the area is buying or selling power, whether its integrated interchange is above or below schedule, and whether the existing interchange is corrective or non-corrective. The area load dispatcher is thus relieved of keeping these circumstances in mind and need simply control or adjust the generation in his area in accordance with the excess or deficiency indication of exhibiting element 30.

When it is desirable to automatically re-initiate an integrating period, there may be used the arrangement shown in Fig. 4 in which the shaft 139 corresponds with shaft 39 of the aforesaid Ross patent. The friction drive member 47 on shaft 139 engages disk 48 carrying the adjustable element of the slidewire device 44, 45. Thus, in manner above described the slidewire 45 is positioned relative to its contact 44 in accordance with the integrated deviations from schedule. At fixed intervals, for example hourly, the cam 49 on shaft 50 driven at constant speed by any suitable device effects closure of switch 51 to energize a solenoid 56 of a reset mechanism 53 in which in the particular form shown comprises a heart cam 54 attached to the slidewire shaft 52 and an actuating pawl 55 movable into engagement with the cam upon energization of solenoid 56. Thus, at stated intervals the slidewire 45 is moved to bring its zero point into coincidence with the slidewire contact 44.

In the modification shown in Fig. 1, the potential differences relating to the differences between the settings of the dials 11, 12 and 13 and the impedances, adjusted by the load-responsive, frequency-responsive, time-error responsive and integrated load deviation-responsive devices 15, 16, 17 and 18 are provided by circuits energizable in parallel from a common source. These potential differences represent effects which are concurrently combined to produce a resultant effect which is a direct measure of the change in generation required of the area to satisfy the tie-line load-schedule at the existing system frequency and to meet the other requirements of the network including corrections for time-error and the like. In the network of Fig. 1, the magnitude of a balancing effect is adjusted as by the impedances of rheostats 27 and 28 to reduce the resultant effect (that applied to detector 22) to zero, the extent of adjustment as appearing at the index 30 relative to scale 31 then being a measure of the required change of generation. The same type of operation also occurs in Fig. 3.

In the modification shown in Fig. 3, these potential differences are produced by circuits connected in series in network 10a and energizable from separate sources or a common source through isolating transformers.

More particularly, in Fig. 3 the circuit 59 is a split potentiometer energized through a transformer 60 from a source 61. The load schedule dial 11 is effective to position contact 21 relative to slidewire 28A in accordance with the tie-line load in effect generally as above described. The slidewire 20 is adjusted relative to contact 21A by the wattmeter 15 responsive as above described to the tie-line load of the area.

The network 62 is a split circuit potentiometer energized through transformer 63 from source 61. The impedances 25, 26 provide a point of fixed reference potential 23. The slidewire 28A is the rebalancing slidewire adjustable by the detector 22 through the electrical or electromechanical rebalancing mechanism 29.

When the area is operating on flat tie-line load, the schedule switches 14A, 14B are positioned to connect the detector 22 between contact 21 and the contact of slidewire 28A and to connect the point 23 with the contact 21A of wattmeter slidewire 20. Thus, the slidewire 28A is adjusted to balance the potential-difference produced by network 59 against the potential-difference produced by the network 62 and the position of the exhibiting element 30 continuously corresponds, under balanced conditions, with the existing deviation of the actual tie-line load from the scheduled tie-line load indicated by dial 11.

The network 62 also includes the slidewire device 44, 45, the relative position of the slidewire and contact being determined by the integrator 18 in manner above described in connection with Fig. 1. When the area is operating in correction of the deviation from a flat tie-line load schedule, the schedule switches 14A, 14B are positioned to connect the detector 22 to the contact 21 of the load schedule dial arrangement 11 and to connect the contact 44 of the integrator slidewire 45 with the contact 21A of the wattmeter slidewire 20. In such case as discussed in connection with Fig. 1, the detector responds to the net effects of deviation in instantaneous tie-line load and the integration of the tie-line load deviations to position the exhibiting element so that as above described the area load dispatcher can directly determine the excess or deficiency of generation.

The circuit 64 is a split circuit potentiometer energized through transformer 65 from source 61. The slidewire 35 included in this circuit is adjusted relative to its contact by dial 12 which is set in accordance with the scheduled system frequency. In this circuit is also included the adjustable impedance devices 32, 33, the relative position of the contact and slidewire being effected by the frequency meter 16. This circuit also includes the frequency bias slidewire 37 which is set by dial 13 in accordance with the scheduled area bias. When the area is operating under frequency-biased tie-line load schedule, the schedule switch 14a is set to connect the contact 21 of dial 11 to the contact of frequency slidewire 35. The detector 22 is in circuit between the contact 32 of the frequency meter slidewire 33 and the contact of the rebalancing slidewire 28A and contact 21A of the wattmeter slidewire 20 is connected through switch 14B to the reference potential point 23 of circuit 62. With such connections, the detector 22 responds to the potential differences of the three circuits 59, 62 and 64 to position the indicator 30 to indicate the excess or deficiency in generation from the schedule requirements, all as above described in connection with Fig. 1.

The network 64 includes the slidewire 42 adjusted relative to its contact by the time-error meter 17. When the area is operating under time-error correction schedule, the schedule switches 14A, 14B are positioned to connect contact 21 of slidewire 20A in circuit 59 with the contact of slidewire 42 in circuit 64 and to connect the point 23 of circuit 62 to the contact 21A of wattmeter slidewire 20 in circuit 59. With the circuits so connected, the detector 22 responds to the potential differences of the three circuits 59, 62, 64 to position the exhibiting element 30 in accordance with the excess or deficiency of generation to meet the time-error schedule requirements, all as discussed in connection with Fig. 1.

If the area is on a schedule requiring both correction of system time-error and integrated generation deviation of the area, the schedule switches 14A, 14B are positioned to connect contact 21 of slidewire 20A in circuit 59 to the contact of slidewire 42 of circuit 64 and to connect the contact 44 of slidewire 45 in circuit 62 with contact 21A of the wattmeter slidewire 20 in circuit 59. With such connection, the potential differences between contacts 21 and 21A of circuit 59, the potential difference between the contacts of slidewires 33 and 42 in circuit 64 and the potential difference between the contacts of slidewire 28A and 45 in circuit 62 are added in alegbraic summation to the detector 22 which accordingly positions the exhibiting element 30 in accordance with the excess or deficiency of generation to meet with this complex schedule requirement.

For the first time, the area load dispatcher is directly and continuously informed of the change in generation required to satisfy any of various schedules imposed by contractual obligations, dispatcher's order or emergencies without need for consideration and evaluation of factors, and interrelationships of factors, which affect the required generation and at least some of which are not determinable from the metering equipment heretofore provided. In the absence of the present invention, the change in generation required involved tedious computations which when performed were often no longer of utility because of intervening change in any one or more of the various factors above discussed.

What is claimed is:

1. An arrangement for exhibiting deviations from scheduled requirements of a generating area connected by at least one tie-line to a power distribution system comprising a network having first and second circuits including impedances and having at least one source of current, said first circuit having an impedance-adjusting means settable to correspond with a scheduled tie-line load and an impedance-adjusting means whose setting is varied in correspondence with existing tie-line load, the difference in settings providing a potential-difference varying with tie-line load deviations, said second circuit including impedance-adjusting means whose setting is varied in correspondence with existing system frequency and impedance-adjusting means whose setting is varied in correspondence with existing system time-error, the difference in settings providing a second potential-difference varying as a function of system time-error and system frequency, a detector, circuit connections for applying to said detector the algebraic sum of said potential differences, an impedance in said network adjustable under control of said detector to balance said sum, and exhibiting means adjusted with said balancing impedance to indicate the excess or deficiency of generation in said area with respect to a tie-line load schedule involving correction of system time-error.

2. An arrangement as in claim 1 in which the network has a multiplicity of current sources, in which the two circuits are respectively energized from two of said sources and in which the balancing impedance is excited from a third of said sources.

3. An arrangement as in claim 1 in which the network additionally includes a third circuit including impedance traversed by current from one of said sources and having impedance-adjusting means settable to correspond with a scheduled system frequency and impedance-adjusting means whose setting is varied in correspondence with existing system frequency, the difference in settings providing a third potential-difference varying with system-frequency deviations, and in which said circuit connections include switching means providing for application to the detector of the algebraic sum of the first and second, or the first and third, of said potential differences whereby the exhibiting means indicates or records excess or deficiency of generation in the area with respect to tie-line load schedules respectively involving system time-error and maintenance of a scheduled system frequency.

4. An arrangement as in claim 3 which additionally includes integrating means coupled to said exhibiting means to indicate the integrated excess or deficiency of generation in the area for a period during which different of said schedules are in effect.

5. An arrangement as in claim 3 in which the network has a multiplicity of current sources, in which the first circuit is excited from a first of said sources, in which the second and third circuits are excited from a second of said sources, and in which the balancing impedance is excited from a third of said sources.

6. An arrangement as in claim 3 in which the network additionally includes a fourth circuit having impedances traversed by current from one of said sources to provide a fixed fourth potential-difference, and in which the switching means provides for selective application to the detector of the alegbraic sum of the first and second, first and third, and first and fourth of said potential differences whereby the exhibiting means indicates or records excess or deficiency of generation in the area with respect to load schedules respectively involving system time-error, maintenance of a scheduled system frequency and flat tie-line load.

7. An arrangement as in claim 6 in which the circuits are in shunt with a common source of exciting voltage, the first circuit including the balancing impedance and forming two arms of a Wheatstone bridge having their junction point connected to one input terminal of the detector, the remainder of the circuits each forming a pair of arms of the bridge, the junction points of the pairs being selectively connected to the other input terminal of the detector by the switching means to correspond with the schedule in effect.

8. An arrangement as in claim 6 in which the network has a multiplicity of current sources, in which the first circuit is excited from a first of said sources, in which the second and third circuits are excited from a second of said sources, and in which the fourth circuit and the balancing impedance are excited from a third of said sources.

9. An arrangement as in claim 6 in which the network additionally includes a fifth circuit including impedance traversed by current from one of said sources and having impedance-adjusting means whose setting is varied in correspondence with the integrated tie-line load error of the area, and in which the switching means provides for application to the detector of the alegbraic sum of the first and second, first and third, first and fourth, and first and fifth of said potential differences with respect to load schedules respectively involving system time-error, system-frequency error, flat tie-line load and integrated tie-line load error.

10. An arrangement for exhibiting deviations from scheduled requirements of a generating area connected by at least one tie-line to a power distribution system comprising a network having first and second circuits including impedances and having at least one source of current, said first circuit having impedance-adjusting means settable to correspond with a scheduled tie-line load and an impedance-adjusting means whose setting is varied in correspondence with existing tie-line load, the difference in setting providing a first potential-difference varying with tie-line load deviations, said second circuit having impedance-adjusting means settable to correspond with a scheduled system frequency and impedance-adjusting means whose setting is varied in correspondence with existing system frequency, the difference in settings providing a second potential-difference varying with system-frequency deviations, a detector, circuit connections for applying to said detector the algebraic sum of said potential differences, an impedance traversed by current from one of said sources and adjustable under control of said detector to balance said sum, and exhibiting means adjusted with said balancing impedance to indicate the excess or deficiency of generation in said area with respect to tie-line load schedule involving maintenance of a scheduled system frequency.

11. An arrangement as in claim 10 in which the network additionally includes a third circuit having impedances traversed by current from one of said sources to provide a fixed third potential-difference, and in which switching means provides for application to the detector of the algebraic sum of the first and second, or the first and third, of said potential differences whereby the exhibiting means indicates or records excess or deficiency of generation in the area with respect to tie-line load schedules respectively involving maintenance of scheduled system frequency and flat tie-line load.

12. An arrangement for exhibiting deviation from scheduled requirements of a generating area connected by at least one tie-line to a power distribution system comprising a network having first and second circuits including impedances and having at least one source of current, said first circuit having impedance-adjusting means settable to correspond with a scheduled tie-line load and an impedance-adjusting means whose setting is varied in correspondence with existing tie-line load, the difference in settings providing a first potential-difference varying with tie-line load deviations, said second circuit having impedance-adjusting means varied in accordance with integrated tie-line load error of the area, a detector, circuit connections for applying to said detector the algebraic sum of said potential differences, an impedance traversed by current from one of said sources and adjustable under control of said detector to balance said sum, and exhibiting means adjusted with said balancing impedance to indicate the excess or deficiency of generation in said area with respect to a flat tie-line load schedule.

13. In control of the generation in an area interconnected by at least one tie-line to a power-distribution system and operating under a frequency-biased tie-line load schedule, a method which comprises producing effects respectively corresponding with the scheduled system frequency and the existing system frequency, producing effects respectively corresponding with the scheduled tie-line load and the existing tie-line load, combining concurrent magnitudes of said effects with a fixed bias effect to produce a resultant effect, and adjusting a balancing effect to reduce said resultant effect to zero, the extent of adjustment of said balancing effect being a direct measure of the change in generation required of the area to satisfy its frequency-biased tie-line load schedule at the existing system frequency.

14. For control of generation in an area interconnected by at least one tie-line to a power-distribution system and operating on a frequency-biased tie-line load schedule, comprising means for producing and combining effects corresponding with scheduled frequency, existing frequency, existing deviation from scheduled tie-line load and frequency-bias, and balancing means for modifying the resultant of the combined effects in sense and to extent required to obtain a predetermined reference value, the sense and extent of such modification being a measure of the change in area generation required to satisfy its frequency-biased tie-line load schedule at the existing system frequency.

15. For control of generation in an area interconnected by at least one tie-line with a power-distribution system and operating on a frequency-biased tie-line load schedule, a balanceable system comprising means manually set to produce effects respectively corresponding with scheduled system frequency, frequency bias, and tie-line load at said scheduled system frequency, responsive means to produce effects respectively corresponding with existing frequency and existing tie-line load, and means effectively balancing the resultant of said effects produced by said manually set means and by said responsive means to provide a direct measure of the change in area generation required to satisfy said frequency-biased tie-line load schedule at the existing frequency.

16. For control of generation in an area interconnected by at least one tie-line with a power-distribution system and operating on a frequency-biased tie-line load schedule, a balanceable system comprising means for producing a first effect in accordance with deviation of tie-line load from a set value, means for producing a second effect in accordance with existing system frequency, means including manually adjustable means set in accordance with scheduled frequency and frequency-bias for combining said first and second effects to produce a resultant effect, an unbalance detector, and means responsive to said unbalance detector for producing a rebalancing effect of magnitude to restore balance of said balanceable system, the magnitude of said rebalancing effect providing a direct measure of the change in area generation required to satisfy said frequency-biased tie-line load schedule at the existing frequency.

References Cited in the file of this patent

UNITED STATES PATENTS

| Number | Name | Date |
|---|---|---|
| 2,054,411 | Doyle | Sept. 15, 1936 |
| 2,124,725 | Williams, Jr., et al. | July 26, 1938 |
| 2,397,540 | Dome | Apr. 2, 1946 |
| 2,456,499 | Fritzinger | Dec. 14, 1948 |
| 2,537,498 | Wickesser | Jan. 9, 1951 |